(12) United States Patent
Schellhorn

(10) Patent No.: US 6,241,426 B1
(45) Date of Patent: Jun. 5, 2001

(54) METHOD FOR FORMING AN INTERCONNECTED UNDERGROUND STRUCTURE

(75) Inventor: Verne L. Schellhorn, Gualala, CA (US)

(73) Assignee: Aerial Industrial, Inc., Gualala, CA (US)

( * ) Notice: Subject to any disclaimer, the term of this patent is extended or adjusted under 35 U.S.C. 154(b) by 0 days.

(21) Appl. No.: 09/318,184

(22) Filed: May 25, 1999

(51) Int. Cl.⁷ ............................ B65G 5/00; C09K 17/00; E02D 3/12; E02D 29/00; G21F 9/00

(52) U.S. Cl. ....................... 405/267; 405/57; 405/128; 405/233; 405/248; 405/256; 405/268; 405/270; 588/250; 210/901

(58) Field of Search ................. 405/52, 55, 57, 405/128, 129, 232, 233, 237, 239, 248, 256, 266, 267, 268, 270; 588/249, 250; 210/901

(56) References Cited

U.S. PATENT DOCUMENTS

| | | | |
|---|---|---|---|
| 3,354,656 | * 11/1967 | Fahnestock | 405/57 |
| 3,608,318 | * 9/1971 | Levy et al. | 405/266 |
| 3,969,902 | * 7/1976 | Ichise et al. | 405/267 |
| 4,566,825 | * 1/1986 | Hirai et al. | 405/267 |
| 5,294,215 | * 3/1994 | Millgard | 405/266 |
| 5,490,743 | * 2/1996 | Vales | 405/266 |
| 5,678,957 | * 10/1997 | Lipsker | 405/267 X |
| 5,816,748 | * 10/1998 | Kleiser et al. | 588/250 X |
| 6,123,484 | * 9/2000 | Fujita | 405/233 |

* cited by examiner

Primary Examiner—David Bagnell
Assistant Examiner—Tara L. Mayo
(74) Attorney, Agent, or Firm—Bruce H. Johnsonbaugh

(57) ABSTRACT

A method is provided for forming an interconnected underground structure which avoids settling of adjacent soil structure. A plurality of underground support columns is initially formed, with the support columns being spaced apart in a predetermined pattern. Interconnecting holes are thereafter formed between the underground support columns, wherein the interconnecting holes are formed by mechanically cutting the soil and simultaneously hydraulically mixing the mechanically cut soil with slurry injected at velocities of 200 feet per second or higher while maintaining a positive hydrostatic head in the hole relative to adjacent soil. As the interconnecting holes are being formed, the diameter of each interconnecting hole is extended by positioning a second high velocity slurry nozzle near the outer diameter of the interconnecting hole which injects high velocity into the adjacent soil to hydraulically cut the adjacent soil and mix it with the slurry. The high velocity slurry injected through the second nozzle penetrates the surface of the adjacent underground support columns and forms an impermeable underground support wall. The method may be used to treat and stabilize highly toxic underground plumes.

10 Claims, 12 Drawing Sheets

METHOD FOR FORMING AN INTERCONNECTED UNDERGROUND STRUCTURE

BACKGROUND AND BRIEF SUMMARY OF THE INVENTION

The present invention relates in general to a method of forming an array of underground support columns. More specifically, a preferred embodiment of the present invention relates to a method for forming an interconnected underground, impermeable wall. A second embodiment of the invention provides a method for treating and stabilizing highly toxic underground plumes to reduce or eliminate migration of the toxic plumes. The present method may be utilized in caving soils and is performed without causing the settlement of adjacent soil structure. The present invention avoids settlement of adjacent soil structure by maintaining a positive hydrostatic head in each hole as the hole is being formed.

The prior art includes U.S. Pat. No. 3,969,902 to Ichise et al and teaches a method for constructing a continuous row of underground piles. The single greatest drawback of Ichise et al is that the method will simply not work in caving soils. Ichise et al proposes that the hole is drilled first. Ichise teaches at column 3, lines 32–35, lines 50–53 and lines 60–63, that a hole is completely dug before any ground hardening liquid is inserted through inner tube 6. The difficulty with the Ichise et al approach is that, if it is attempted in caving soils, the caving side walls will effectively prevent the formation of a cylindrical hole and, alternately, ground water may enter the hole and seriously weaken the underground structure. A second drawback of Ichise et al is that the auger used requires a dual injection system which in turn requires the use of a complex double walled earth drill capable of simultaneously injecting a ground hardening liquid and mortar (see column 1, lines 60–64 and column 3, lines 36–43).

It is also known in the prior art to utilize a drilling system wherein a high pressure jet is provided near the cutting tip of the auger to hydraulically assist the breaking up of soil and to inject cement slurry (or other slurry) to create a soil cement mixture (or other mixtures) which forms an underground column. Those prior art patents include three patents owned by the assignee of the present application. Those patents include U.S. Pat. Nos. 4,793,740; 4,958,962 and 5,396,964. Those three patents are hereby incorporated herein by reference as if set forth in full. Those patents teach the combined mechanical and hydraulic cutting and mixing as a hole is being formed. Those patents teach the use of a positive hydrostatic head in the hole relative to adjacent soil. However, those patents do not teach a method of extending the diameter of a hole by the use of a high pressure, high velocity slurry pumped through a nozzle mounted near the outer diameter of the hole, whereby the diameter of the hole is effectively being expanded while the hole is being formed and while a positive hydrostatic head is being maintained in the hole relative to the adjacent soil.

The present invention provides a method of forming an interconnected underground structure, such as an impermeable wall or a support footing for buildings or structures, without causing settlement of adjacent soil structure and which can be used in caving soils.

It is, therefore, a primary object of the present invention to provide a method capable of forming an interconnected underground structure which can be utilized in caving soils and which does not cause settling of adjacent soil.

A further object of the present invention is to form an interconnected underground wall wherein a positive hydrostatic head is maintained during the entire time frame in which each hole is being formed, relative to the adjacent soil.

Yet another object of the invention is to provide a method of forming an impermeable underground wall which effectively prevents the lateral migration therethrough of underground water as well as underground water borne toxic materials.

A further object of the invention is to provide a method capable of solidifying underground soil and forming an impermeable underground structure of a soil cement mixture which is both impermeable and which is resistant to the lateral flow of underground toxic materials.

Yet another object of the invention is to provide a method of surrounding a toxic underground plume with a wall and thereafter modifying the entire volume contained by the wall to reduce or prevent the migration of the toxic plume.

Other objects and advantages of the invention will become apparent from the following description and the drawings wherein:

DETAILED DESCRIPTION OF THE DRAWINGS

Figure 1:
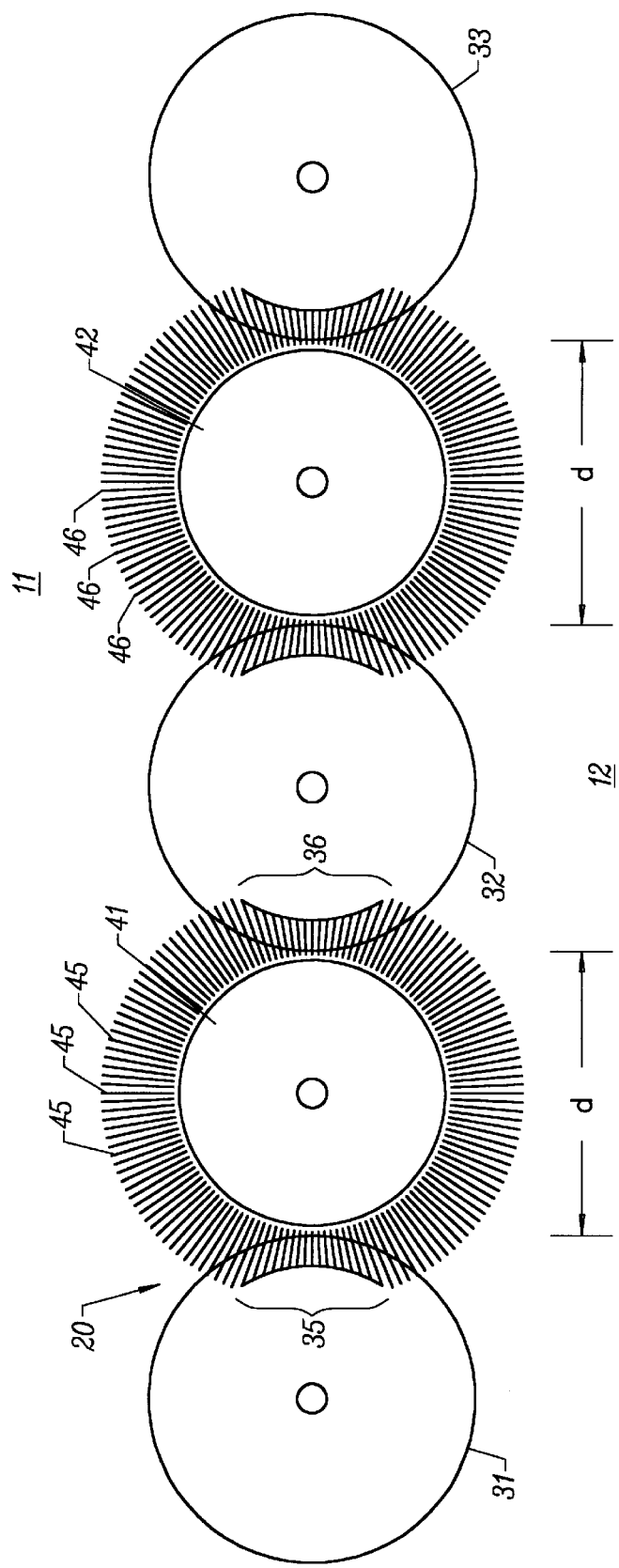
FIG. 1 is a schematic representation showing a first embodiment of the invention wherein a plan view is shown of three underground support columns with two interconnecting holes formed between the support columns.

FIG. 1 illustrates a first embodiment of the present invention wherein the underground structure is referred to generally as 20 and includes a plurality of underground support columns 31, 32 and 33 and interconnecting holes 41 and 42. Underground support columns 31, 32 and 33 as shown in FIG. 1 have their centers aligned on a straight line, each have the same diameter and are spaced apart so that their edges are separated by a predetermined distance "d." Support columns 31, 32 and 33 are preferably formed by a method of simultaneously mechanically cutting the soil and simultaneously hydraulically mixing the soil as it has been mechanically cut, with a cement slurry (or other slurry) injected through a first nozzle at velocities of 200 ft./sec. or higher while maintaining a positive hydrostatic head in each hole relative to the adjacent soil 11 shown on one side of structure 20 and adjacent soil 12 shown on the opposite side of structure 20. The support columns 31, 32 and 33 may be formed by the method and apparatus shown and claimed in U.S. Pat. Nos. 4,793,740; 4,958,962 and 5,396,964. Alternately, support columns 31, 32 and 33 can be precast concrete columns or columns made of other materials and either driven into the sub-soil or placed in holes drilled into the sub-soil.

A plurality of interconnecting holes 41 and 42 is formed in the spaces between support columns 31 and 32 and between support columns 32 and 33, respectively. The interconnecting holes 41 and 42 are formed by mechanically cutting the soil with an auger having an outer diameter less than "d" and simultaneously hydraulically mixing the mechanically cut soil with cement slurry (or other slurry) injected through a first cutting nozzle at velocities of 200 ft./sec. or higher and simultaneously maintaining a positive hydrostatic head in the holes relative to the adjacent soil. The positive hydrostatic head is maintained in the holes by constantly injecting cement slurry or other slurry into each of the holes 41 and 42 as they are being formed. Maintaining the positive hydrostatic head prevents caving of the side walls as the holes 41 and 42 are being formed and also prevents settling of adjacent soil 11 and 12 as may be caused by sloughing of that soil into the holes or the entry of ground water into the holes 41 and 42.

As the interconnecting holes 41 and 42 are being formed, their diameters are simultaneously hydraulically extended as shown schematically by the array of lines 45 and 46. The mechanical auger used to form holes 41 and 42 tends to remain centered between adjacent support columns because the adjacent support columns are harder than the soil being cut. The hydraulic extension of the diameter is caused by a second nozzle (shown best in FIG. 8) which is carried near the outer diameter of holes 41 and 42 and which is pointed outwardly away from the center of the hole. As an example, if the diameter of holes 41 and 42 is 3 feet, the hydraulic extension in most soils is approximately 6–10 inches, thereby expanding the diameter of holes 41 and 42 by approximately 12 to 20 inches. As the interconnecting holes 41 and 42 are being extended, the high velocity cement slurry (or other slurry) cuts the soil and thoroughly mixes the cement slurry (or other slurry) with the soil, leaving a soil-cement mixture in place. As hole 41 is being extended, the high pressure jets 45 penetrate the surface of adjacent support columns 31 and 32 as shown at regions 35 and 36. The purpose of slightly penetrating the surfaces of columns 31 and 32 at regions 35 and 36 is to create an impermeable seal between columns 31 and 32 on the one hand and interconnecting hole 41 on the other hand. The seal is impermeable to underground water and toxins borne by underground water. The pattern of support columns and interconnecting holes shown in FIG. 1 may be extended as required by each job.

Figure 2:
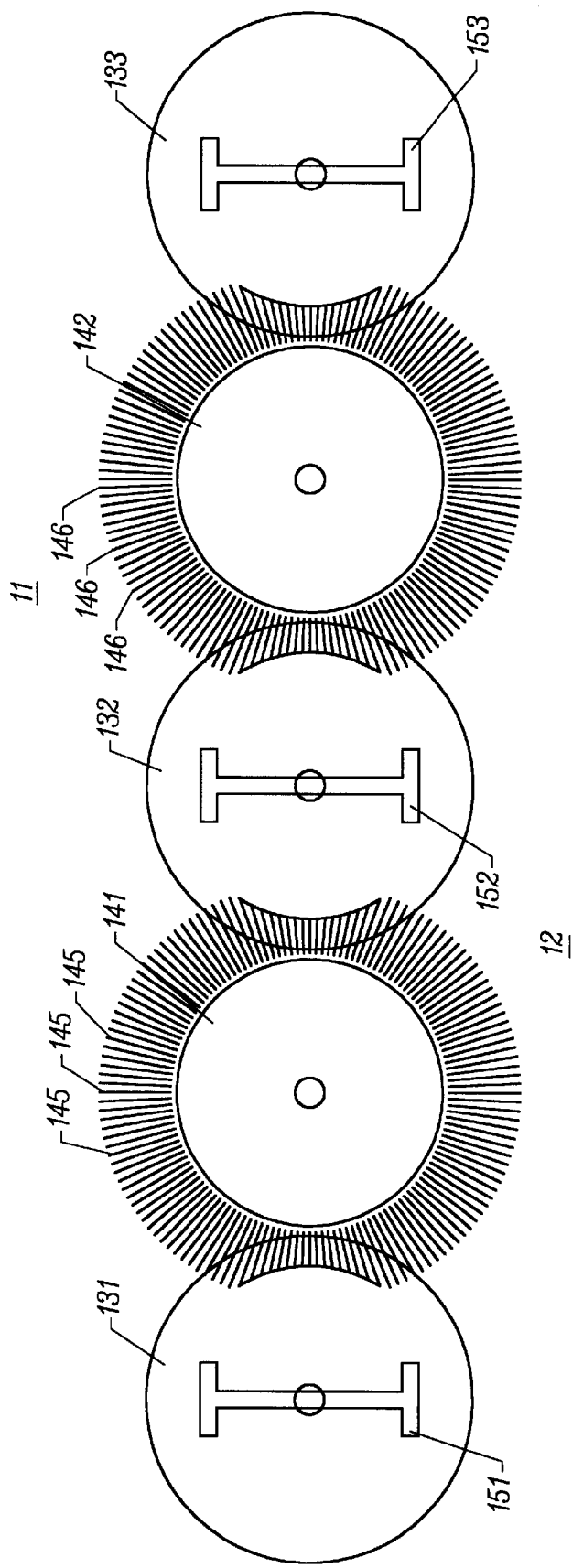
FIG. 2 is a schematic representation of a second form of the invention, essentially the same as that shown in FIG. 1, except that the three underground support columns have had steel I-beams inserted in them to provide structural support.

FIG. 2 shows a second embodiment wherein support columns 131, 132 and 133 have had structural steel I-beams 151, 152 and 153 inserted therein. Reinforced underground support columns 131, 132 and 133 may be driven into the ground by pile driving equipment or may be inserted into holes drilled to receive the reinforced and precast columns. In the preferred embodiment, the reinforced columns are formed by mechanically cutting and hydraulically mixing the soil as shown in U.S. Pat. Nos. 4,793,740; 4,958,962 and 5,396,964 and the I-beams placed in the support column before the soil-cement mixture sets up.

Figure 3:
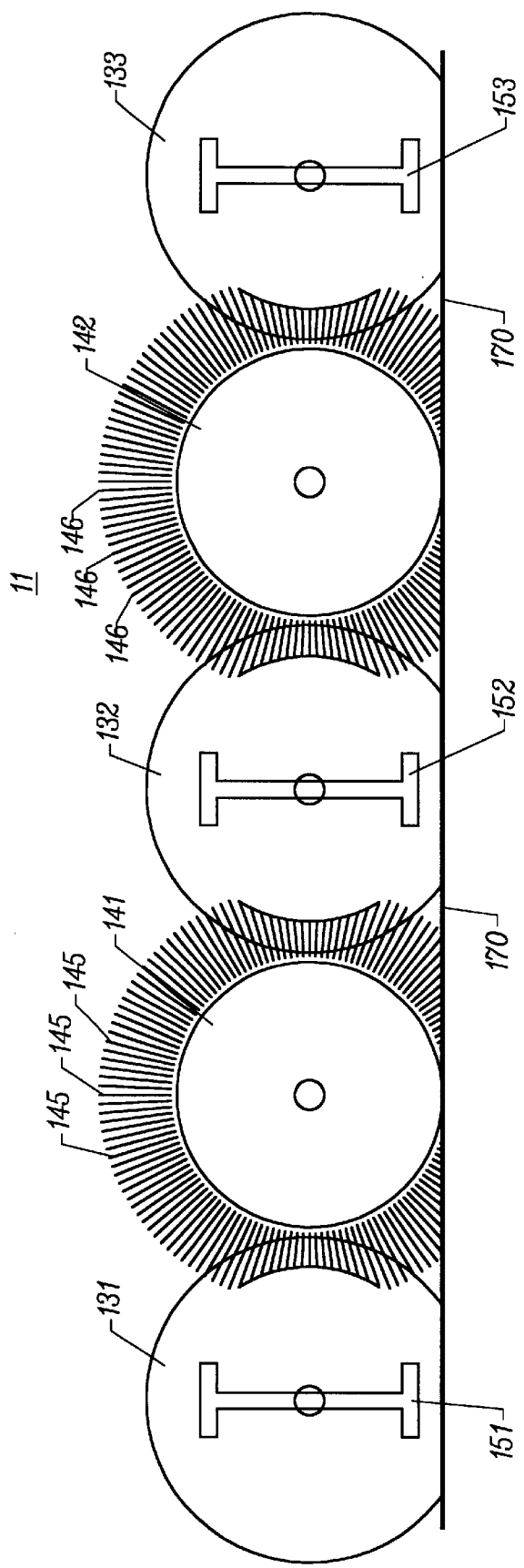
FIG. 3 shows the interconnected underground structure shown in FIG. 2 after an excavation has been performed and a wall formed along one edge of the underground structure.

FIG. 3 shows the embodiment of FIG. 2 wherein the adjacent soil 12 shown in FIG. 2 has been excavated along a boundary line 170. Boundary line 170 becomes a wall and is impermeable with respect to a water table in adjacent soil 11 which is closer to the surface than the bottom of columns 131–133 and interconnecting holes 141 and 142. The boundary line 170 extends into a portion of support columns 131, 132 and 133 as well as into the expanded portions 145 and 146 of interconnecting holes 141 and 142. The purpose of locating the boundary 170 at that position is to produce a wall that has a surface formed at boundary 170 that is primarily a hardened soil-cement mixture with only small sections of untreated soil.

Figure 4:
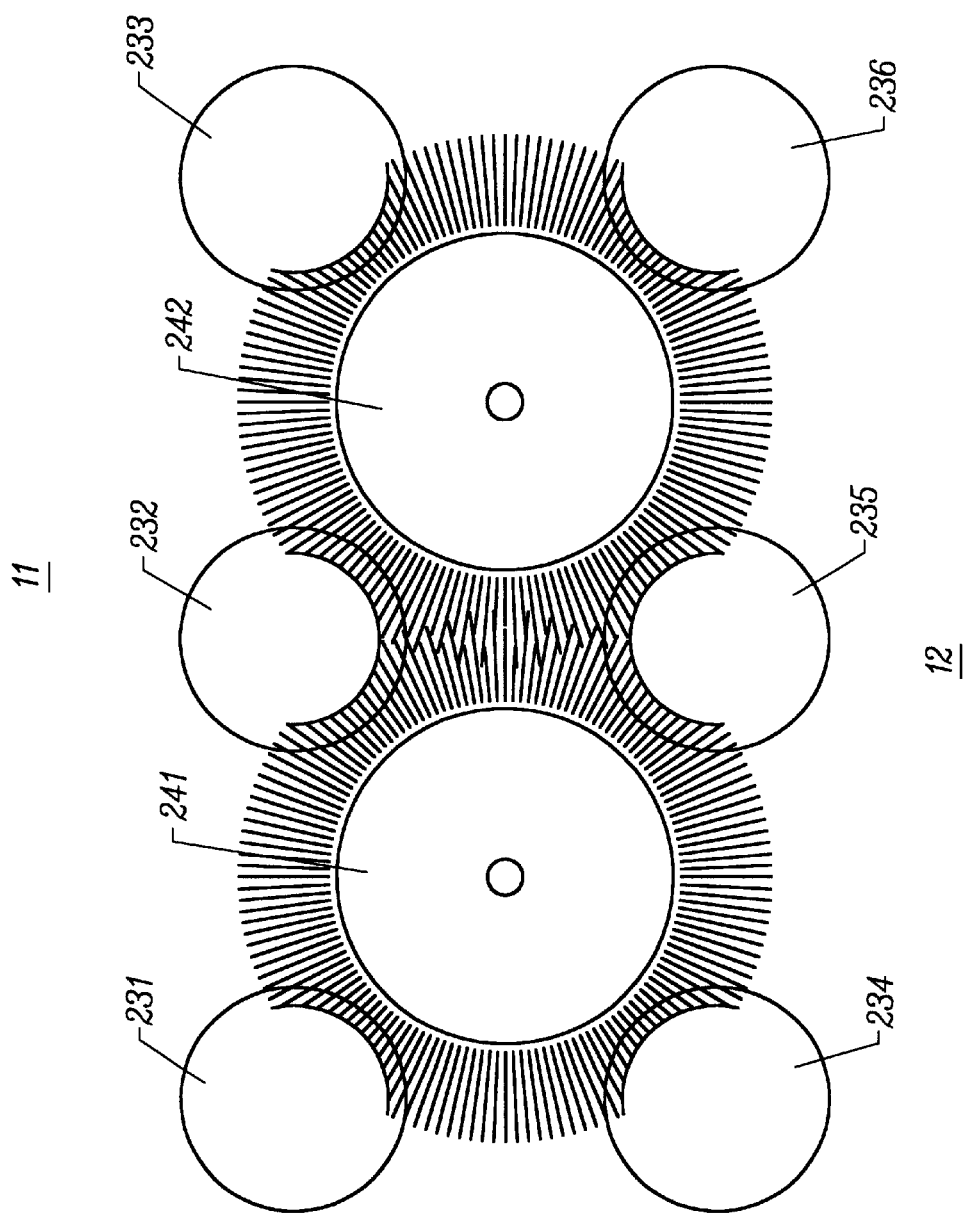
FIG. 4 shows yet another embodiment of the invention showing a square pattern of underground support columns and interconnecting holes.

FIG. 4 shows a further embodiment of the invention wherein a "square pattern" is utilized in locating and placing support columns 231–236. Support columns 231–236 are placed in the "square pattern" as shown in FIG. 4. Interconnecting holes 241 and 242 are formed in the intermediate spaces between the support columns once the support columns have been placed and/or allowed to set up. The pattern in FIG. 4 may be repeated on a large scale when the invention is utilized to treat underground toxic plumes, for example. The pattern shown in FIG. 4 is intended to treat the entire volumetric area since the support columns and interconnecting holes are located and sized so that the entire volume of soil is mixed with the high pressure, high velocity slurry. In the case of underground toxic plumes, the purpose is to expose all of the toxic underground materials to the slurry so that the slurry may bind with the water borne toxins. The pattern shown in FIG. 4 is also effective for creating an impermeable underground wall for a variety of purposes, such as to become a structural wall for an excavation on either side of the structure in adjacent soil 11 in one direction or in adjacent soil 12 in the other direction.

Figure 5:
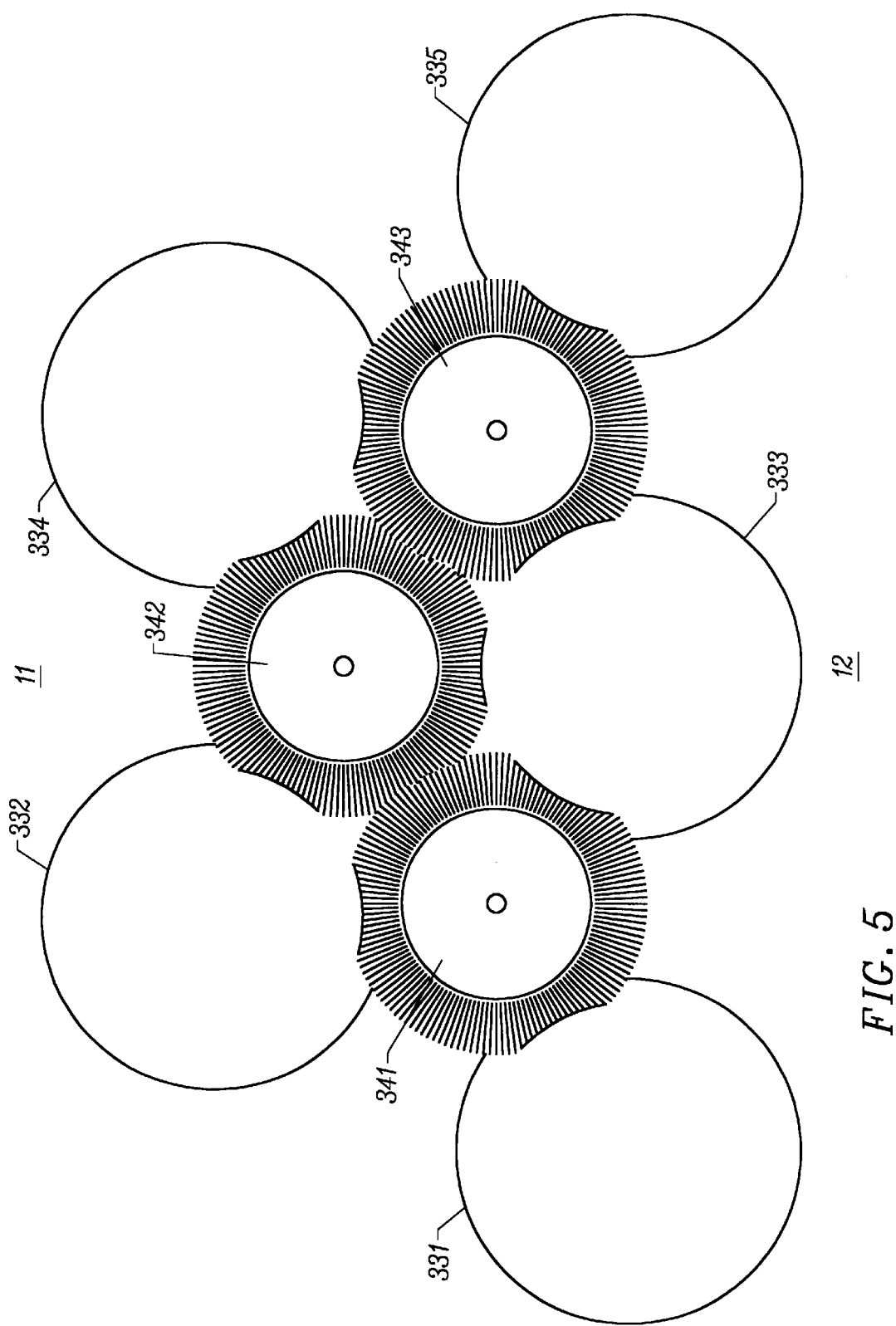
FIG. 5 shows another form of the invention utilizing a triangular array of support columns together with interconnecting holes.

FIG. 5 shows schematically a "triangular shaped" pattern of support columns 331–335. In this pattern, the centers of the underground support columns 331–335 are arranged as the points of an equilateral triangular and interconnecting holes 341, 342 and 343 are formed in the spaces between adjacent triangular patterns of support columns. The pattern shown in FIG. 5 can be used to create an impermeable wall and can also be used to thoroughly mix the entire volume of the underground material, since the pattern when repeated is capable of reaching and causing all of the underground soil within the pattern to be mixed with the slurry.

Figure 6:
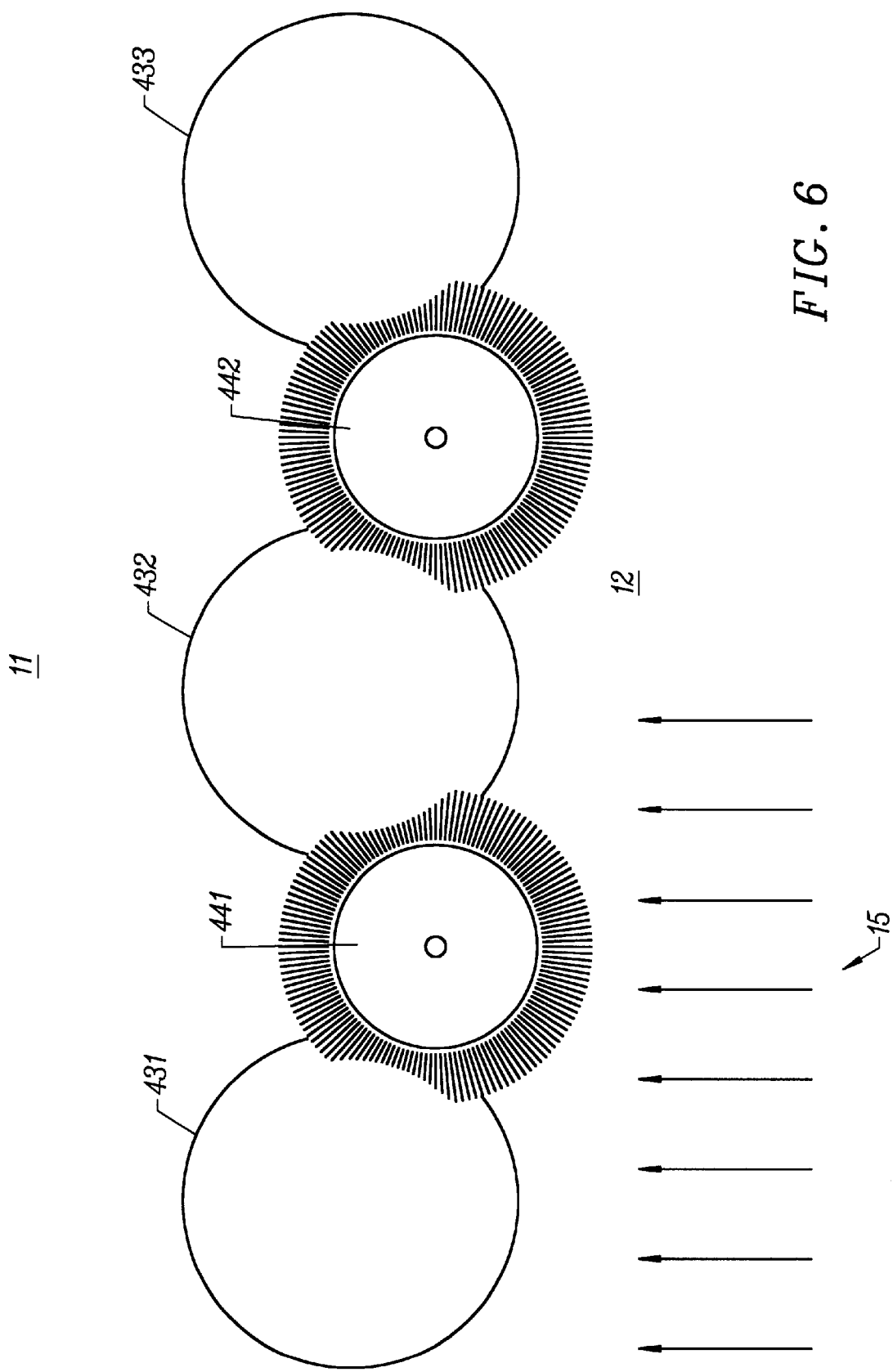
FIG. 6 shows yet another embodiment of the invention wherein the centers of the interconnecting holes are displaced from the centers of the support columns.

FIG. 6 shows yet another embodiment wherein the underground support columns 431 and 432 are formed along a straight line formed by the centers. In this embodiment, the centers of 4 interconnecting holes 441 and 442 are displaced in the direction towards adjacent soil 12. The purpose of displacing the centers of interconnecting holes 441 and 442 is that, if adjacent soil 11 is excavated below the level of the water table in adjacent soil 12, the hydrostatic pressure of the water table as shown by arrows 15 tends to urge the column formed in interconnecting hole 441 towards adjacent support columns 431 and 432. The impermeable connection is therefore maintained by the hydrostatic pressure of the water table.

Figure 7:
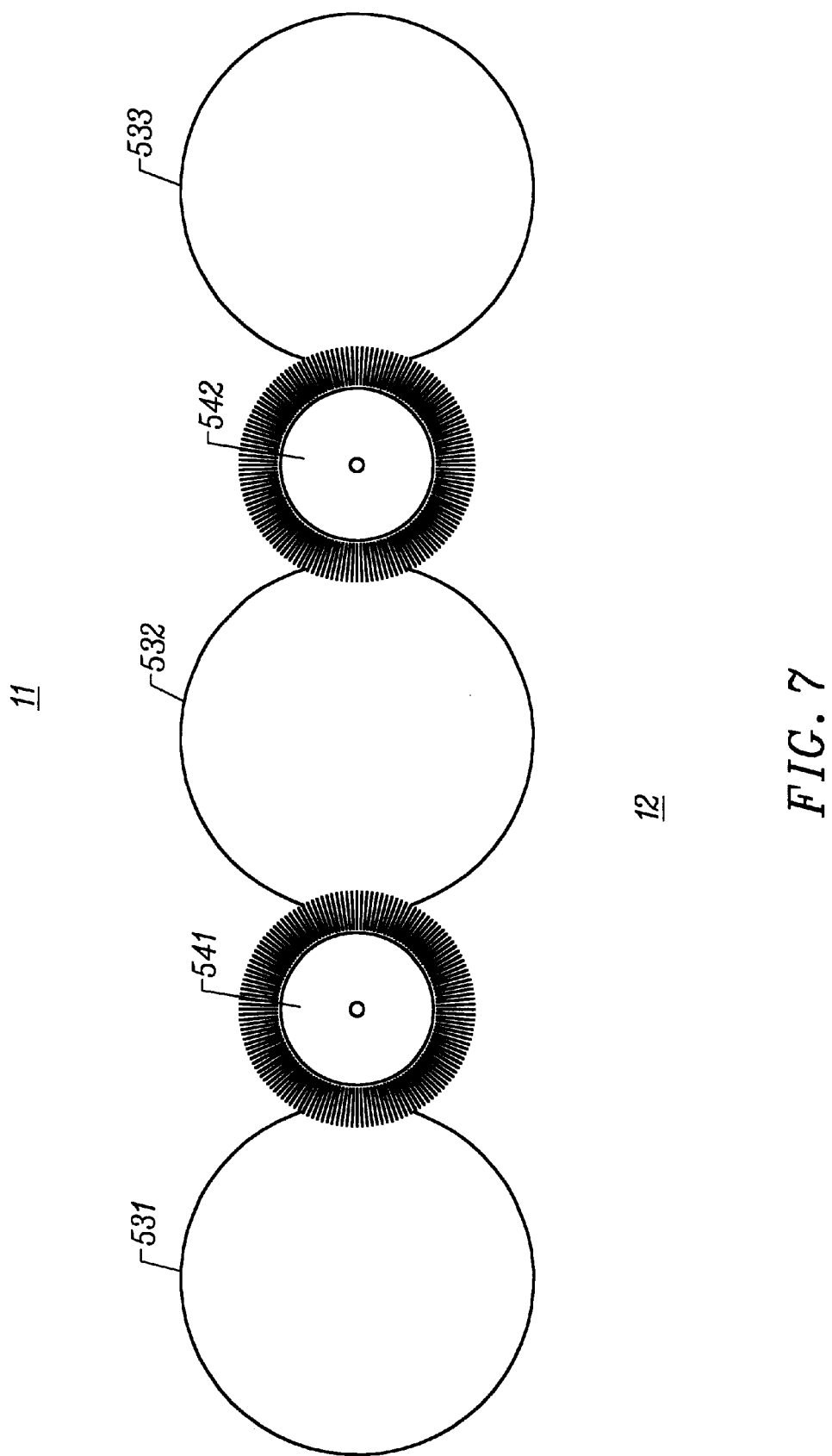
FIG. 7 shows another form of the invention wherein the interconnecting holes are of considerably smaller diameter than the support columns.

FIG. 7 shows still another embodiment of the invention wherein the diameters of the underground support columns 531 and 532 are significantly larger than the diameter of the interconnecting holes 541,542.

Figure 8:
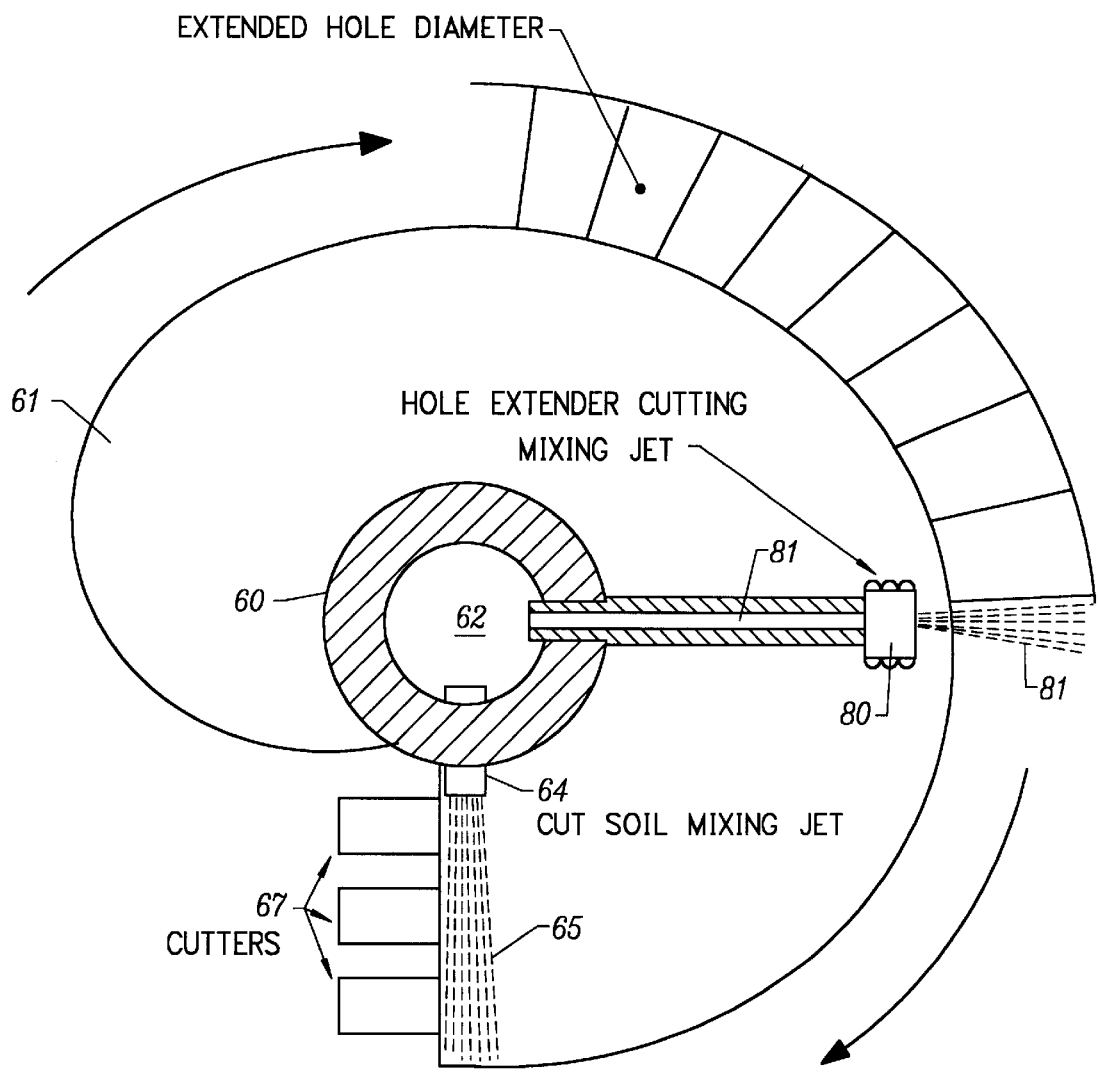
FIG. 8 is a plan view of a soil processing tool for use with the present invention showing the nozzle design for expanding the diameter of the interconnecting hole.

FIG. 8 shows a plan view, partially in section, of a portion of a soil processing tool used to create the interconnecting holes of the present invention. A hollow Kelley 60 carries a single flight auger 61. High pressure slurry is injected through the center 62 of hollow Kelley and is forced through first nozzle 64 to create a high pressure jet 65 which hydraulically mixes the soil cut by cutting blades 67. A second nozzle 80 is carried by the top of flight 61 and is hydraulically connected by passageway 81 to the interior 62 of hollow Kelley 60. The high pressure mixing jet 81 is preferably oriented FIG. 11, the process is continued until the entire volume of the underground toxic plume 610 has been subjected to the mixing action of the present invention with the high velocity slurry. The slurry used for underground toxic plumes is preferably a mixture of bentonite or other clay based drilling fluids and Portland cement. The resultant underground columns will therefore tend to remain somewhat pliable and resistant to cracking. The Portland cement binds to the water carrying the water borne toxin material and therefore binds with the water borne toxins and prevents or eliminates migration of the toxic plume.

Figure 9:
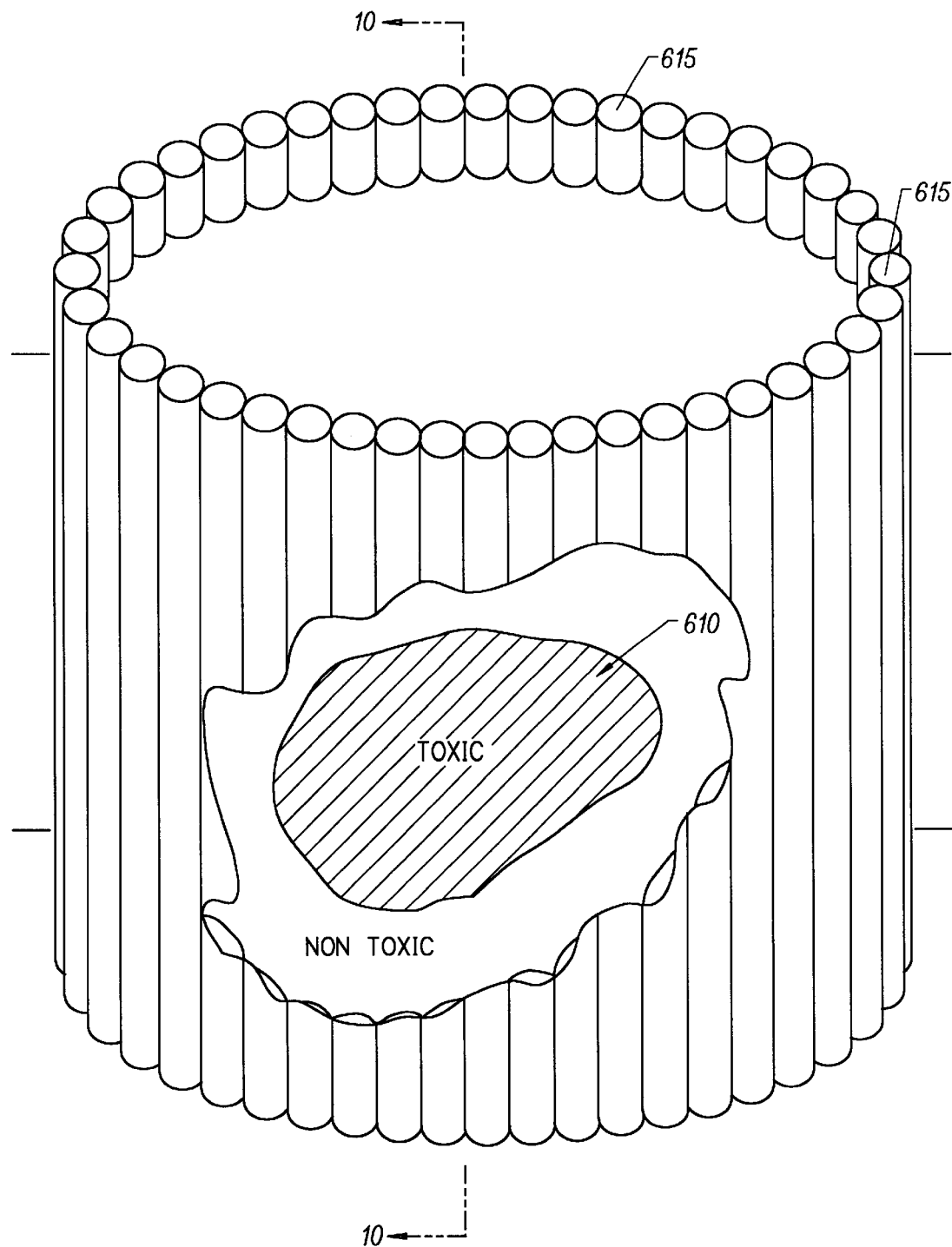
FIG. 9 is a schematic perspective representation of an underground toxic plume after an impermeable wall has been formed surrounding the plume.
Figure 10:
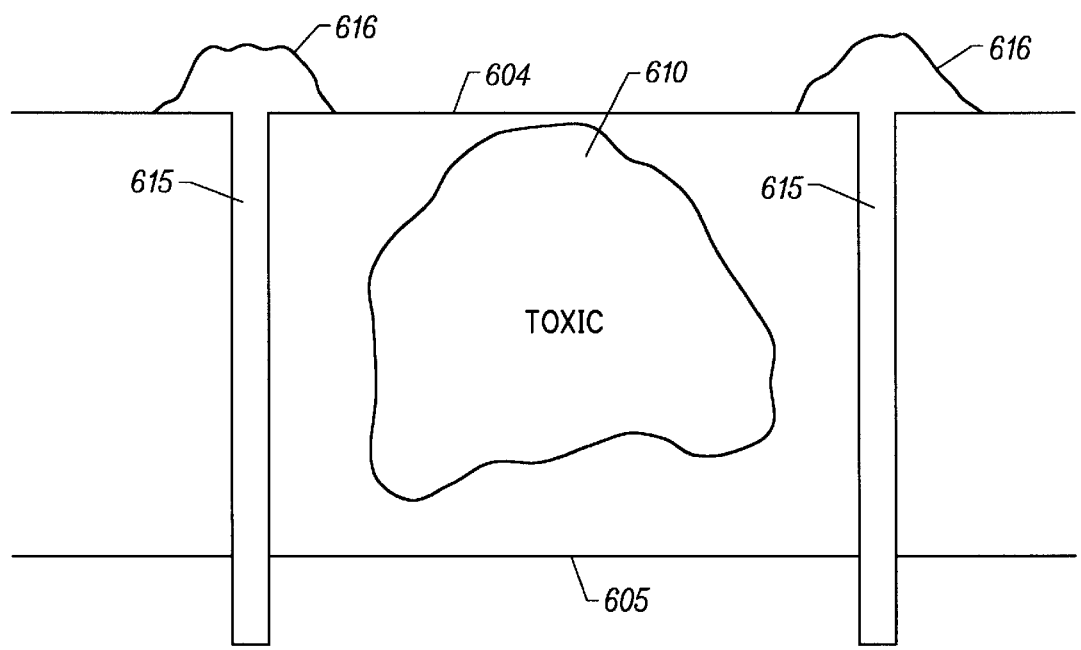
FIG. 10 is a section on the line 10—10 of FIG. 9.
Figure 11:
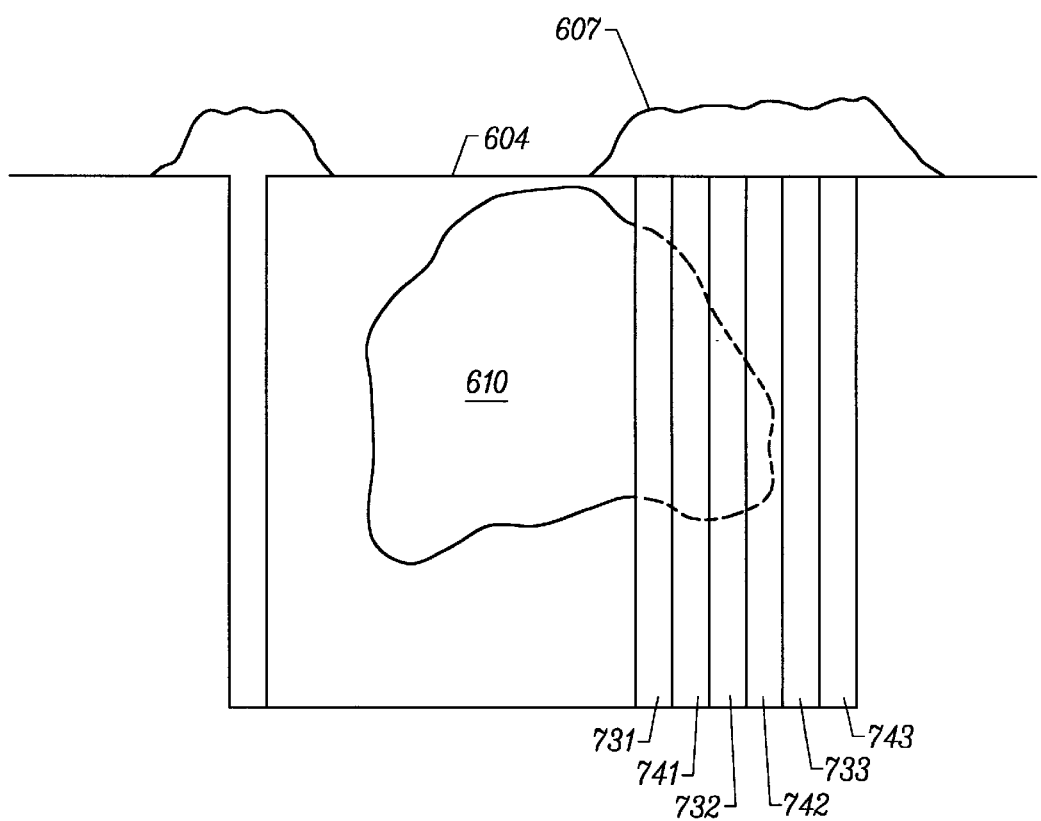
FIG. 11 is a sectional view of FIG. 10 after a portion of the underground plume has been modified in accordance with the invention.
Figure 12:
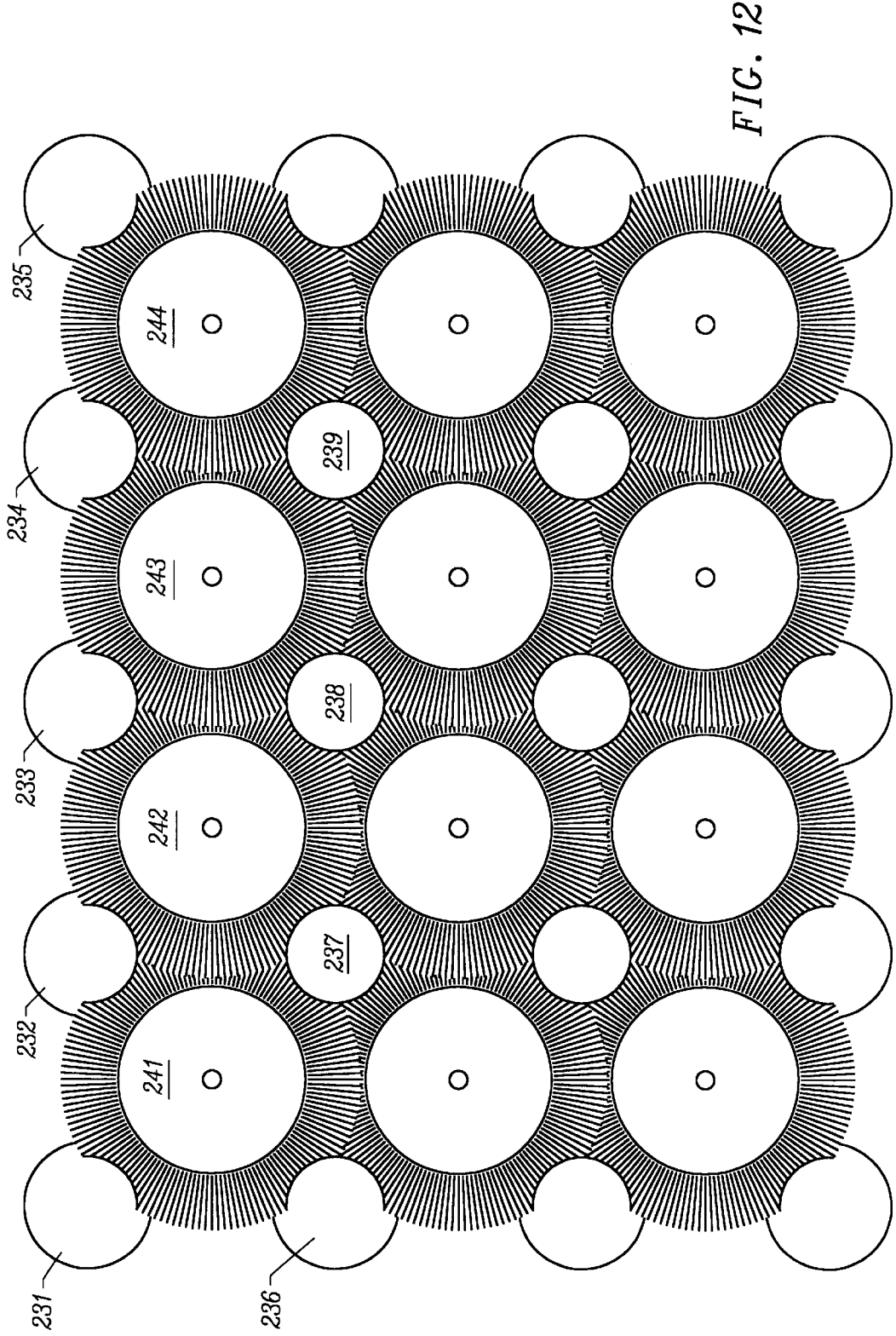
FIG. 12 is a schematic representation of one pattern of support columns and interconnecting holes which may be utilized to modify underground toxic plumes.

FIG. 12 is a schematic representation of the square pattern of FIG. 4 showing the pattern expanded somewhat as would be the case if that pattern were selected to treat an underground plume such as shown in FIGS. 9–11. Nine of the support columns shown in FIG. 12 are numbered 231–239 and four interconnecting holes are numbered 241–244.

It is to be understood that various slurries may be injected with the present method for a variety of purposes. The slurries may be designed to react with various underground materials. Also, the slurries may be designed to be detected by surface mounted detection equipment, for example, It is also to be understood that various other patterns of underground support columns and interconnecting holes may be used without departing from the invention.

What is claimed is:

1. A method for forming an underground structure comprising a plurality of interconnected, mixed soil-cement columns, without causing settlement of adjacent soil structure, comprising the steps:

forming a plurality of underground support columns, said support columns being spaced apart in a predetermined pattern, forming an interconnecting hole between at least two of said first plurality of underground support columns, said hole being formed by mechanically cutting the soil and simultaneously hydraulically mixing said mechanically cut soil with cement slurry injected through a first nozzle at velocities of 200 feet per second or higher, and maintaining a positive hydrostatic head in said hole relative to adjacent soil, hydraulically extending the diameter of said interconnecting hole simultaneously with the forming of said interconnecting hole, by positioning a second cement slurry injection nozzle inside the diameter of said interconnecting hole pointed outwardly from said interconnecting hole, injecting said cement slurry through said second nozzle into adjacent soil to hydraulically cut said adjacent soil and mix said cut soil with said cement slurry until the entire volume of said interconnecting hole is filled with a mixed, impermeable soil cement combination, and penetrating the surface of, and interconnecting with, said two underground support columns with said cement slurry injected through said second nozzle.

2. The method of claim 1 wherein the step of forming said plurality of underground support columns comprises patterning the plurality of support columns so that the centers of said support columns lie in a straight line and wherein the outer edges of adjacent columns are spaced apart a distance "d."

3. The method of claim 2 wherein the step of forming said plurality of said interconnecting holes comprises patterning the centers of said interconnecting holes so that they are aligned with the centers of said support columns.

4. The me hod of claim 3 comprising the further step of excavating adjacent soil structure and excavating a portion of said support columns and said interconnecting holes to form a wall with a flat su face facing the excavation.

5. The method of claim 2 wherein the step of forming said plurality of interconnecting holes comprises patterning the centers of said interconnecting holes so that they are offset a predetermined distance in a first direction from the centers of said support columns.

6. The method of claim 5 wherein said adjacent soil structure has a water table closer to the surface than the bottom of said support columns and the bottom of said interconnecting holes and wherein the underground structure formed includes columns formed in said interconnecting holes, and said structure is an impermeable wall, comprising the further step of:

excavating adjacent soil structure on the side of said support columns opposite said interconnecting holes, whereby the hydrostatic pressure of said water table urges said columns formed in said interconnecting holes against said support columns.

7. The method of claim 1 wherein each of said plurality of underground support columns is formed by mechanically cutting the soil and simultaneously hydraulically mixing said mechanically cut soil with slurry injected at velocities of 200 feet per second or higher, and maintaining a positive hydrostatic head in each hole relative to adjacent soil.

8. A method for treating and stabilizing a toxic underground plume including water borne toxins by forming a plurality of interconnected, underground, mixed soil-cement columns, wherein said columns occupy the entire volume of said toxic plume and bind with said water borne toxins of said plume, comprising the steps:

modifying the entire underground volume of said highly toxic plume by forming a first plurality of underground columns, said columns being spaced apart in a predetermined pattern, said columns each being formed by mechanically forming a hole by cutting the soil and simultaneously hydraulically mixing said mechanically cut soil with cement slurry injected through a first nozzle at velocities of 200 feet per second or higher, and maintaining a positive hydrostatic head in said hole relative to adjacent soil, said cement slurry binding with said water borne toxins, forming a plurality of interconnecting holes in the spaces between said first plurality of underground columns, said holes being formed by mechanically cutting the soil and simultaneously hydraulically mixing said mechanically cut soil with cement slurry injected through a first nozzle at velocities of 200 feet per second or higher, and maintaining a positive hydrostatic head in said holes relative to adjacent soil, hydraulically extending the diameter of said interconnecting holes simultaneously with the forming of each of said interconnecting holes, by positioning a second cement slurry injection nozzle inside the diameter of said interconnecting hole pointed outwardly from said interconnecting hole, injecting said cement slurry through said second nozzle into adjacent soil to hydraulically cut said adjacent soil and mix said cut soil with said slurry until the entire volume of said interconnecting hole is filled with a mixed, impermeable soil-cement combination, penetrating the surface of, and interconnecting with, said adjacent underground columns with said cement slurry injected through said second nozzle, said cement slurry introduced in said interconnecting holes binding with said water borne toxins, and positioning and sizing said plurality of underground columns and said interconnecting holes such that the entire volume of soil is mixed with said cement slurry to bind with the entire volume of water borne toxins of said plume.

9. The method of claim 8 comprising the additional preliminary steps:

surrounding said plume with an impermeable underground wall, forming an above ground dam above said impermeable underground wall.

10. The method of claim 9 wherein the volume of said slurry is between 5% and 20% of the volume of said underground columns and said interconnecting holes.

* * * * *